United States Patent
Specht et al.

(10) Patent No.: US 12,471,861 B2
(45) Date of Patent: Nov. 18, 2025

(54) METALLIC BONE MEASUREMENT SYSTEM AND METHOD

(71) Applicant: Purdue Research Foundation, West Lafayette, IN (US)

(72) Inventors: Aaron James Specht, West Lafayette, IN (US); Linda H. Nie, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 232 days.

(21) Appl. No.: 18/384,073

(22) Filed: Oct. 26, 2023

(65) Prior Publication Data

US 2024/0138790 A1    May 2, 2024

Related U.S. Application Data

(60) Provisional application No. 63/420,136, filed on Oct. 28, 2022.

(51) Int. Cl.
*A61B 6/00* (2024.01)
*A61B 5/00* (2006.01)
*A61B 6/42* (2024.01)

(52) U.S. Cl.
CPC ............. *A61B 6/48* (2013.01); *A61B 5/4509* (2013.01); *A61B 6/4208* (2013.01); *A61B 2560/02* (2013.01)

(58) Field of Classification Search
None
See application file for complete search history.

(56) References Cited

U.S. PATENT DOCUMENTS

| 6,490,339 B2 * | 12/2002 | Mitchell | A61B 6/4216 378/62 |
| 2002/0006181 A1 * | 1/2002 | MacKenzie | A61B 6/583 378/53 |

(Continued)

FOREIGN PATENT DOCUMENTS

CN    107898471 A  *  4/2018  ............. A61B 6/505

OTHER PUBLICATIONS

Chettle, D.R., et al., "Lead in bone: sampling and quantitation using K X-rays excited by 109Cd", Env Health Perspect, Feb. 1991, vol. 91, pp. 49-55.

(Continued)

*Primary Examiner* — Marcus H Taningco
(74) *Attorney, Agent, or Firm* — Purdue Research Foundation

(57) ABSTRACT

The bone measurement system is configured to detect a density of a metallic source within a bone. The bone measurement system includes an x-ray fluorescence (XRF) device, a filter, a radiation detector, a non-transitory computer-readable storage medium storing processor-executable instructions, and a processor. The XRF device may have an x-ray tube including an x-ray source and an anode. The x-ray source may be configured to produce an x-ray beam. The x-ray tube may include a backscatter geometry of around less than one-hundred and eighty degrees to more than ninety degrees. The filter may be disposed along a path of the x-ray beam. The radiation detector may be coupled to the XRF device.

20 Claims, 4 Drawing Sheets

(56) References Cited

U.S. PATENT DOCUMENTS

| | | | | |
|---|---|---|---|---|
| 2007/0092060 | A1* | 4/2007 | Grodzins | G01N 23/223 378/50 |
| 2008/0139914 | A1* | 6/2008 | Gaved | G01T 1/1647 600/407 |
| 2009/0067572 | A1* | 3/2009 | Grodzins | G01N 23/223 378/45 |
| 2009/0086901 | A1* | 4/2009 | Boyden | G01N 23/223 378/45 |
| 2009/0274268 | A1* | 11/2009 | Grodzins | A61B 6/583 378/45 |
| 2014/0081146 | A1* | 3/2014 | Keim | A61B 6/5241 600/407 |

OTHER PUBLICATIONS

Gherase, M.R., et al., "A microbeam grazing-incidence approach to L-shell x-ray fluorescence measurements of lead concentration in bone and soft tissue phantoms", Physiol Meas., Mar. 2018, vol. 39(3), 035007, 17 pages.

Gherase, M.R., et al., "Improvements and reproducibility of an optimal grazing-incidence position method to L-shell x-ray fluorescence measurements of lead in bone and soft tissue phantoms", Biomed Phys Eng Express, Nov. 2018, vol. 4(6), 065024, 16 pages.

Hu, H., et al., "Bone lead as a biological marker in epidemiologic studies of chronic toxicity: conceptual paradigms", Environ Health Perspect, Jan. 2018, vol. 106(1), pp. 1-8.

Nie, H., et al., "Studies in bone lead: A new cadmium-109 XRF measurement system. Modeling bone lead metabolism. Interpreting low concentration data", [Internet] [Thesis (Ph D )]. McMaster University (Canada), 2005.; 2005. Available from: http://libaccess.mcmaster.ca/login?url=http://wwwlib.umi.com/dissertations/fullcit/NR07922, ** pages.

Nie, H., et al., "In vivo quantification of lead in bone with a portable x-ray fluorescence system-methodology and feasibility", Phys Med Biol., Feb. 2011, vol. 56(3), pp. N39-N51.

Rosen, J.F., et al., "Sequential measurements of bone lead content by L X-ray fluorescence in CaNa2EDTA-treated lead-toxic children", Env Health Perspect, Jun. 1991, vol. 93, pp. 271-277.

Specht, A.J., et al., "Portable XRF Technology to Quantify Pb in Bone In Vivo", J Biomark 2014, (2014), 398032, 9 pages.

Specht, A.J., et al., "Lead exposure biomarkers in the Common Loon", Sci Total Env. Jan. 2019, vol. 647, pp. 639-644.

Specht, A.J., et al., "Comparison of bone lead measured via portable x-ray fluorescence across and within bones", Env Res, May 2019, vol. 172, pp. 273-278.

Todd, A.C., et al., "L-shell x-ray fluorescence measurements of lead in bone: accuracy and precision", Phys Med Biol, (2002), vol. 47, pp. 1399-1419.

Zhang, X, et al., "Evaluation of a portable XRF device for in vivo quantification of lead in bone among a US population", Sci Total Environ, Jan. 20, 2021;753:142351, (22 pages).

* cited by examiner

METALLIC BONE MEASUREMENT SYSTEM AND METHOD

CROSS REFERENCE TO RELATED APPLICATIONS

This application claims the priority benefit of U.S. Provisional Patent application No. 63/420,136, filed Oct. 28, 2022, the contents of which is incorporated herein by reference in its entirety.

GOVERNMENT SUPPORT CLAUSE

This invention was made with government support under ES024700 awarded by the National Institutes of Health and under K01OH012528 awarded by the Centers for Disease Control. The government has certain rights in the invention.

FIELD

The disclosure generally relates to measurement tools and, more particularly, to metallic density measurement in bones.

INTRODUCTION

This section provides background information related to the present disclosure which is not necessarily prior art.

Lead continues to be a significant driver of disease and mortality worldwide with studies indicating lower exposures, even lower than 3 ug/dL in blood, having vast impacts on mortality and neurodevelopment. Traditionally, lead surveillance is done using blood lead, but these measurements only reflect acute exposures. Blood lead in adults has a half-life of about 30 days with studies indicating children have a blood lead half-life of a week. Lead acts in the body by mimicking calcium and, thus, will accumulate in bones. Bone, which turns over slowly in the body, serves as a long-term marker of lead exposure with a half-life of 20-30 years. Even in the youngest children, which have faster bone turnover, bone lead can serve as a marker for years of exposure. This fact is brought to attention in studies of serial lead measurements, which seem to indicate peak blood lead is a better indicator of neurodevelopmental detriment. Thus, bone lead is better reflective of neurodevelopment, rather than average blood lead level.

Bone lead has been traditionally measured using x-ray fluorescence (XRF), which can measure the bone non-invasively in vivo. The most successful, previously known XRF measurement systems for measuring bone lead focused on utilizing the k-shell of lead and were referred to commonly as KXRF measurements. The KXRF systems utilized a cadmium-109 radioisotope source for measurement of lead over the mid-tibia. Although this system produced reliable results, and further iterations gave it significant advances in the detection capabilities, it was never widely used due to its significant disadvantages.

The use of the radioisotope source was a major hurdle to most institutions requiring significant regulatory intervention prior to receiving the source. Within the USA, this required amendment of an institutions' broad scope license with the nuclear regulatory commission, which is a significant burden to overcome. Additionally, cadmium-109 is difficult to obtain due to its limited supply.

Furthermore, the KXRF instrument is operated using germanium detections, which require liquid nitrogen cooling to operate properly. The dewar associated with this cooling technique can make the instrument more cumbersome and requires more running costs associated with supplying liquid nitrogen over time.

Finally, the KXRF measurements required a 30-minute measurement time. A 30-minute measurement, while not completely prohibitive, adds additional complications to large scale studies, which could take months to complete in full as only 16 individuals could be measured in an 8-hour time period. The disadvantages of initial and ongoing cost, radioisotope restrictions, and measurement time restricted the KXRF bone lead measurements to only a few institutions worldwide.

The significant disadvantages led to the initial testing for bone lead testing utilizing the L-shell. The L-shell technology presented problems in correcting for soft-tissue thickness. Previous utilization of the L-shell technique for measurement of bone lead was done first in the early 1980's. The technique was tested in children utilizing a 15-minute measurement time. This previous study accounted for skin thickness by utilizing a correction with ultrasound measurements. The system utilized as part of this study was found to be valid for identification of bone lead, but the skin thickness correction proved difficult and drastically impacted the detection capabilities.

More recently, the L-shell technique was similarly used, which included a background geometry of ninety degrees. This background geometry of ninety degrees would have accounted for a litany of difficulties with signal to noise, as well as increased skin thickness perturbation of results. Similarly, a tissue correction factor was used, but would not have accounted for the other confounding variables in the geometry for in vivo measurements. In these known studies, the inadequacy of correction based on soft tissue alone was identified, as adipose and soft tissue have differing attenuation factors for the signal.

Accordingly, there is a continuing need for a metallic bone measurement system that may efficiently and accurately correct for soft-tissue thickness. Desirably, the metallic bone measurement system may be more portable and accessible than known XRF technologies.

SUMMARY

In concordance with the instant disclosure, the metallic bone measurement system may efficiently and accurately correct for soft-tissue thickness. Desirably, the metallic bone measurement system may be more portable and accessible than known XRF technologies.

The bone measurement system is configured to detect a density of a metallic source within a bone. The bone measurement system includes an x-ray fluorescence (XRF) device, a filter, a radiation detector, a non-transitory computer-readable storage medium storing processor-executable instructions, and a processor. The XRF device may have an x-ray tube including an x-ray source and an anode. The x-ray source may be configured to produce an x-ray beam. The x-ray tube may include a backscatter geometry greater than ninety degrees. The filter may be disposed along a path of the x-ray beam. The radiation detector may be coupled to the XRF device. The storage medium may be communicatively coupled to the XRF device. The processor may be electrically coupled to the storage medium. The processor-executable instructions may be executed to (a) calibrate the XRF device, using a Compton scattering normalization method; (b) determine a spectral peak of the metallic source utilizing spectral analysis; (c) quantify a density of the metallic source, based on the determined spectral peak; (d) normalize for a soft tissue thickness utilizing an error propagation equation; and/or (e) output a density of the metallic source within the bone.

Various ways of using the bone measurement system are provided. For instance, a method may include a step of providing an x-ray fluorescence (XRF) device, a filter, a radiation detector, a non-transitory computer-readable storage medium storing processor-executable instructions, and a processor. The XRF device may have an x-ray tube including an x-ray source and an anode. The x-ray source may be configured to produce an x-ray beam. The x-ray tube may include a backscatter geometry greater than ninety degrees. The filter may be disposed along a path of the x-ray beam. The radiation detector may be coupled to the XRF device. The storage medium may be communicatively coupled to the XRF device. The processor may be electrically coupled to the storage medium. Next the method may further include a step of calibrating the XRF device, using a Compton scattering normalization method. Then, a spectral peak of the metallic source may be determined utilizing spectral analysis. Afterwards, a density of the metallic source may be quantified, based on the determined spectral peak. Next, the method may include a step of normalizing for a soft tissue thickness utilizing an error propagation equation. Then, the density of the metallic source within the bone, corrected for soft-tissue thickness, may be outputted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3:
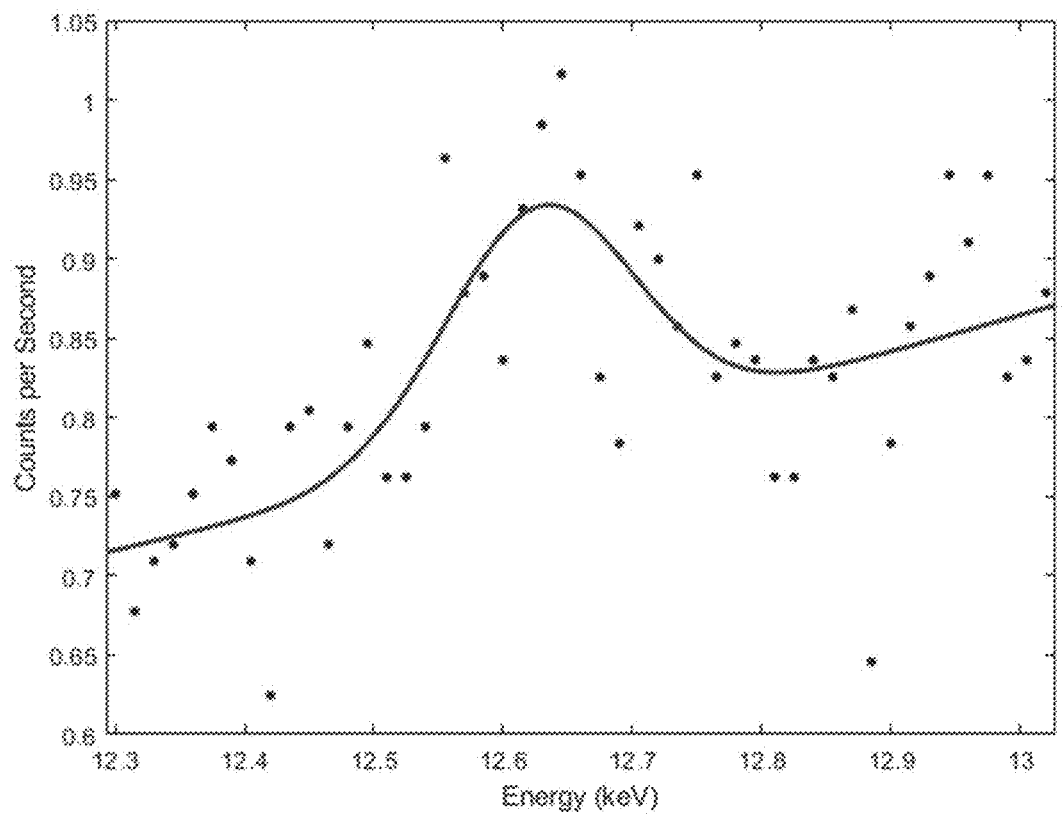
Figure 4:
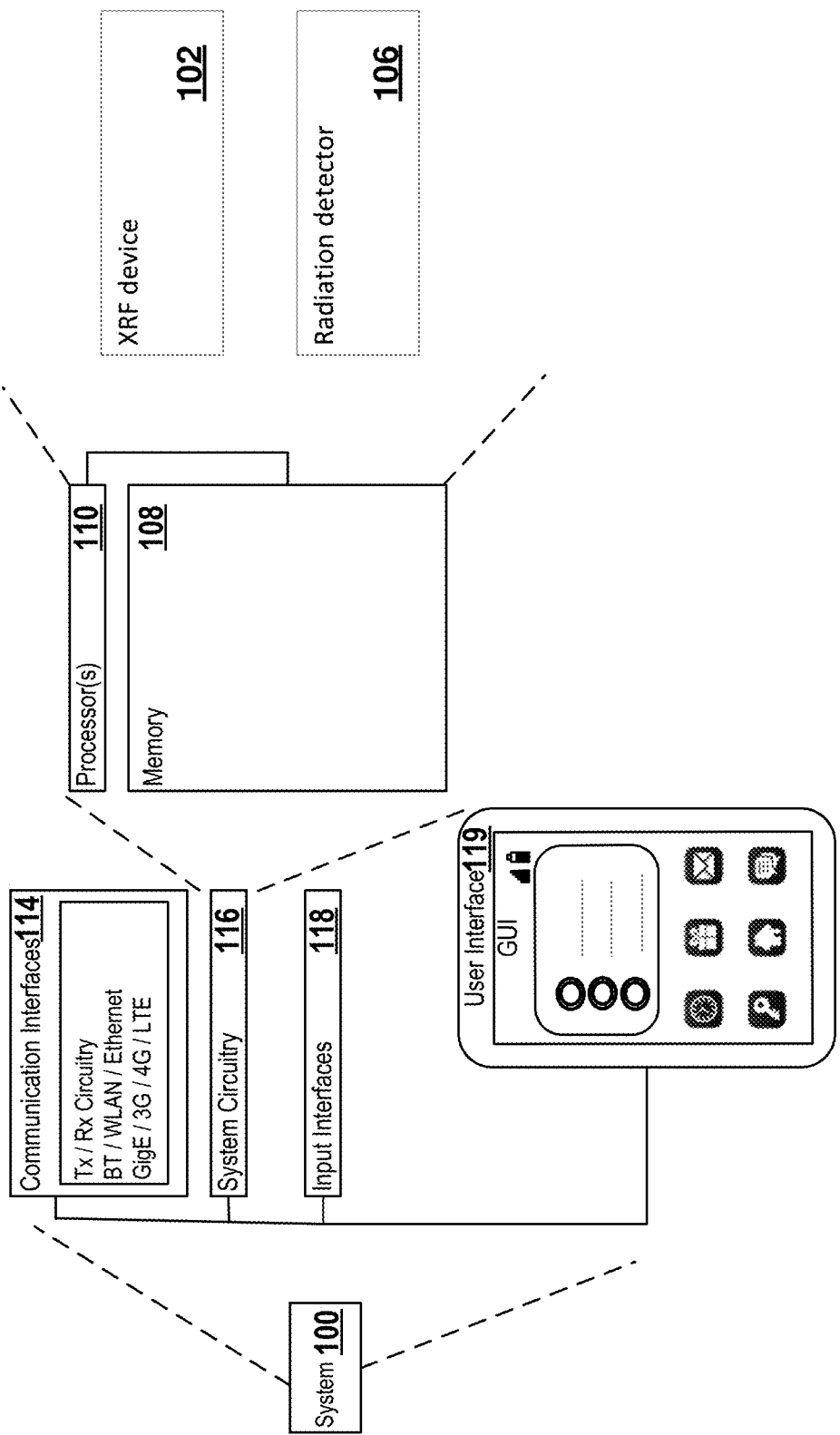

FIG. 3 is a line graph illustrating fitted spectral data for a lead beta peak from an in vivo measurement, according to one embodiment of the present disclosure; and FIG. 4 is a schematic diagram of the bone measurement system, further depicting the system having a communication interface, an input interface, a user interface, and a system circuitry, wherein the system circuitry may include a processor and a memory, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
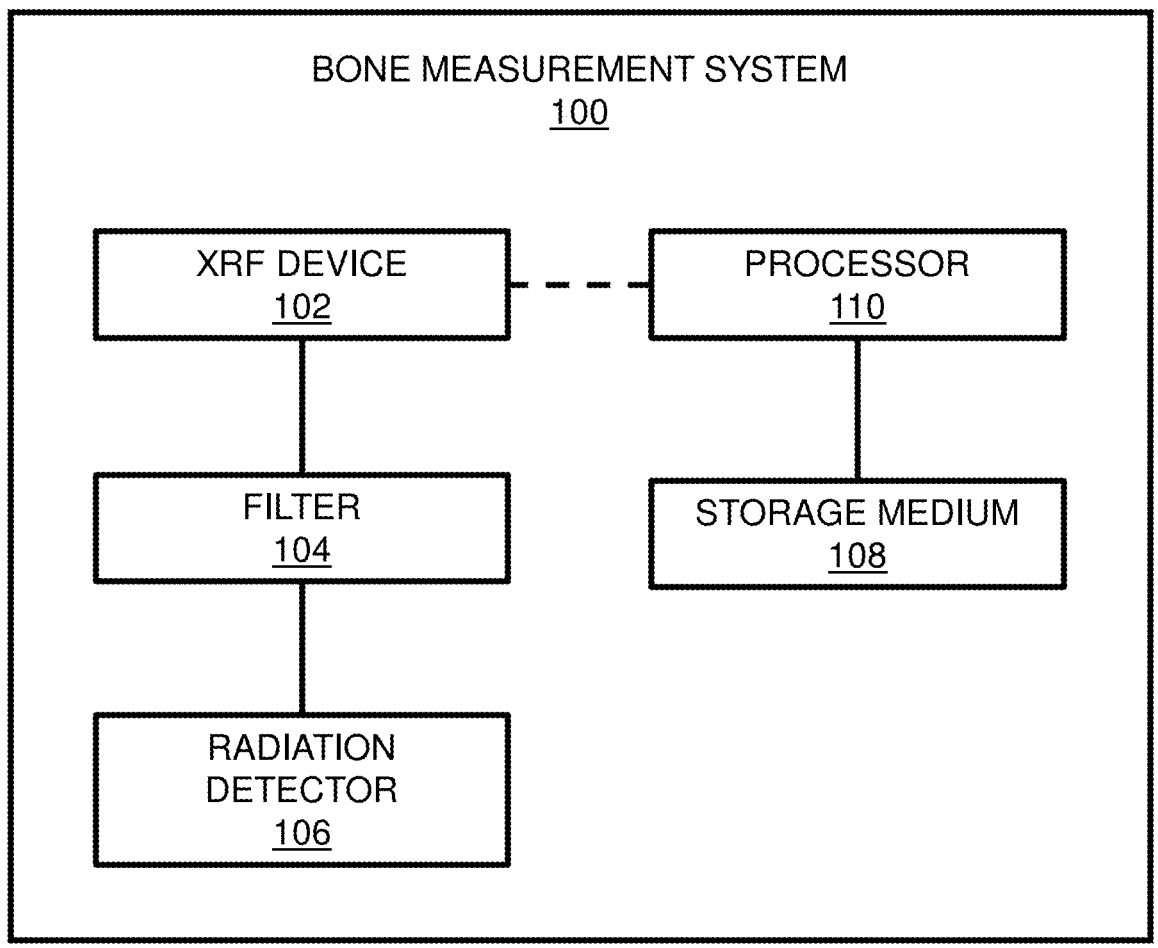
FIG. 1 is a box diagram of a bone measurement system, according to one embodiment of the present disclosure.

As shown in FIG. 1, the bone measurement system 100 is configured to detect a density of a metallic source within a bone. The bone measurement system 100 includes an x-ray fluorescence (XRF) device 102, a filter 104, a radiation detector 106, a non-transitory computer-readable storage medium/memory 108 storing processor-executable instructions, and a processor 110. The XRF device 102 may have an x-ray tube including an x-ray source and an anode. The x-ray source may be configured to produce an x-ray beam. The x-ray tube may include a backscatter geometry of around one-hundred and eighty degrees to more than ninety degrees. In a more specific example, the backscatter geometry may be around one-hundred and sixty degrees. The filter 104 may be disposed along a path of the x-ray beam. The radiation detector 106 may be coupled to the XRF device 102. The storage medium/memory 108 may be communicatively coupled to the XRF device 102. The processor 110 may be electrically coupled to the storage medium/memory 108. The processor-executable instructions may be executed to (a) calibrate the XRF device 102, using a Compton scattering normalization method; (b) determine a spectral peak of the metallic source utilizing spectral analysis; (c) quantify a density of the metallic source, based on the determined spectral peak; (d) normalize for a soft tissue thickness utilizing an error propagation equation; and/or (e) output a density of the metallic source within the bone.

Figure 2:
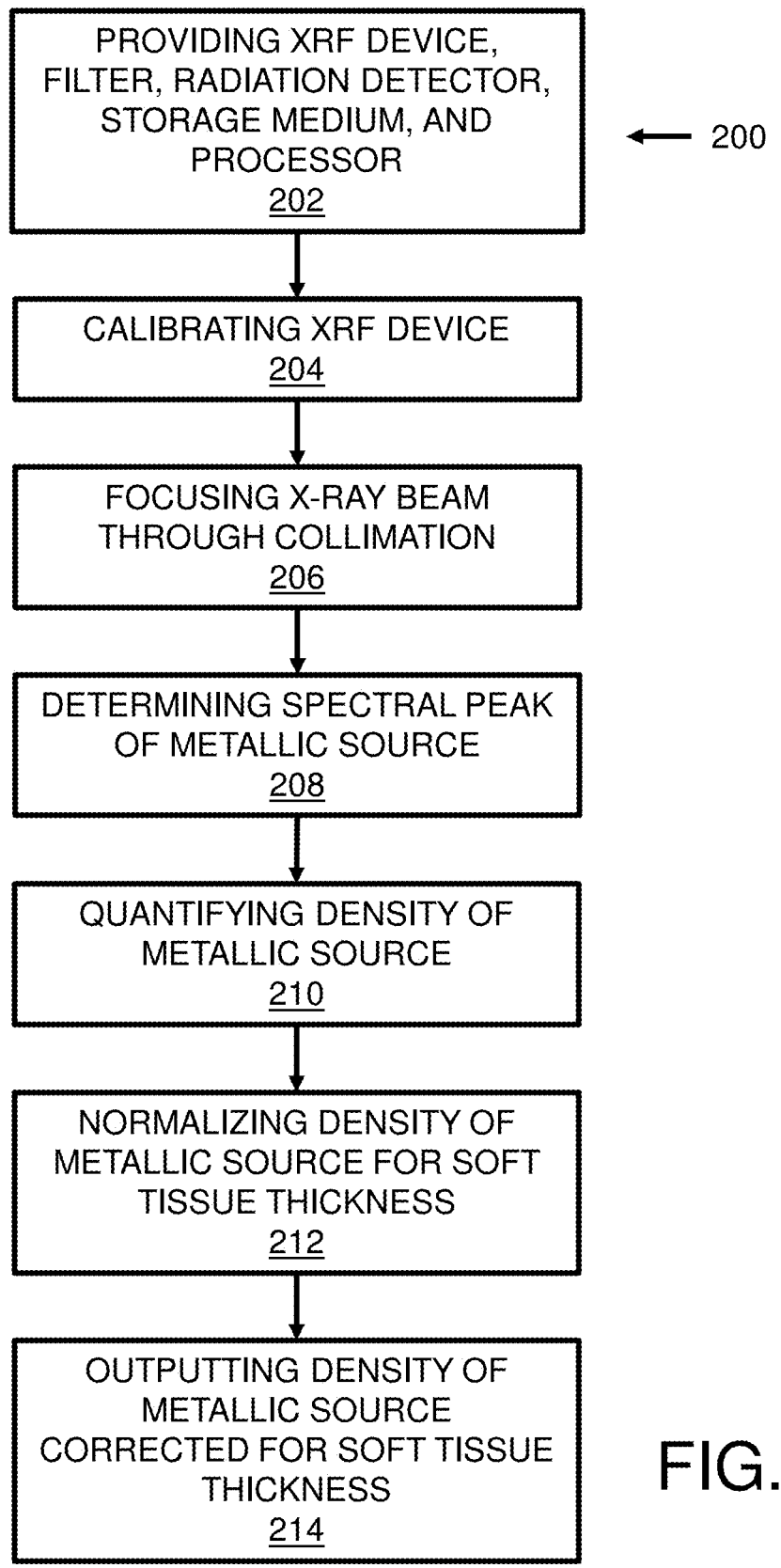
FIG. 2 is a flowchart of a method for using a bone measurement system, according to one embodiment of the present disclosure.

Various ways of using the bone measurement system 100 are provided. For instance, as shown in FIG. 2, a method 200 may include a step 202 of providing an x-ray fluorescence (XRF) device 102, a filter 104, a radiation detector 106, a non-transitory computer-readable storage medium/memory 108 storing processor-executable instructions, and a processor 110. The XRF device 102 may have an x-ray tube including an x-ray source and an anode. The x-ray source may be configured to produce an x-ray beam. The x-ray tube may include a backscatter geometry greater than ninety degrees. The filter 104 may be disposed along a path of the x-ray beam. The radiation detector 106 may be coupled to the XRF device 102. The storage medium/memory 108 may be communicatively coupled to the XRF device 102. The processor 110 may be electrically coupled to the storage medium/memory 108. Next the method may further include a step 204 of calibrating the XRF device 102, using a Compton scattering normalization method. Then, a spectral peak of the metallic source may be determined utilizing spectral analysis. Then, a Compton scattering peak is determined from spectral analysis. Afterwards, a density of the metallic source may be quantified, based on the determined spectral and Compton scattering peaks. Next, the method may include a step 212 of normalizing for a soft tissue thickness utilizing an error propagation equation. Then, the density of the metallic source within the bone, corrected for soft-tissue thickness, may be outputted.

Advantageously, by having a backscatter geometry around one-hundred and sixty degrees, the bone measurement system 100 may decrease a signal production of undesired factors, such as skin thickness. Thus, the spectral peak of the metallic source may be more accurately determined. The backscatter geometry around ninety degrees made signal to noise and detection limits much greater than the known XRF techniques. The soft tissue correction without using spectral results in known XRF techniques made it difficult to account for other geometry issues experienced during in vivo measurements such as slight changes in bone geometry which could account for drastic changes in signal and measured lead concentration for L-shell energies. For instance, any high-density material will mostly produce surface level (i.e., within the first few millimeters) interactions giving signal for the XRF. A ninety-degree geometry or non-backscatter geometry for low energy x-rays will drastically decrease signal production through the increased skin thickness for attenuation of outgoing signal. In addition, the isotropic production of signal from XRF will drop significantly with added distance. A ninety-degree geometry may undesirably add significant distance when considering a true in vivo measurement. Even the addition of a few millimeters will lead to a drop in signal of almost 50%. Known studies indicate air gaps were also causing a significant signal decrease based on this same reasoning. Desirably, a backscatter geometry produces greater signal with dramatic enhancement in detection capabilities for the overall system.

Furthermore, the use of the metallic source spectral results in the present disclosure for the soft tissue correction may more accurately determine the density of the metallic source in the bone. In other words, the normalization based on spectral features creates a much easier methodology when accounting for the myriad variables in measurements. In certain circumstances, the processor-executable instructions may include instructions to perform the spectral analysis. In a specific, non-limiting example, the storage medium/memory 108 and/or the processor 110 may be electrically coupled to the XRF device 102. In an alternative, non-limiting example, the storage medium/memory 108 and/or the processor 110 may wirelessly communicate with the XRF device 102. One skilled in the art may select other suitable ways to provide the spectral analysis, within the scope of the present disclosure.

In certain circumstances, the XRF device 102 may include a portable XRF, such as the Niton XL3t GOLDD+ commercially available from Thermo Fisher®. One skilled in the art may select other suitable XRF devices, within the scope of the present disclosure. For instance, an XRF device with sufficient geometry and radiation detectors should suffice for equivalent measurements given proper calibration. In a specific, non-limiting example, the bone measurement system 100 utilizes a setup with a 50 kV x-ray tube operated at around a 2-watt output (40 uA). The x-ray tube may use a silver anode to produce a majority of characteristic x-rays at 22 keV. A molybdenum anode may alternatively be used similarly, but corresponding scattering peaks do lower the initial energy from the characteristic x-rays closer to that of elemental peaks of interest. Silver at 22 keV, after undergoing Compton scattering, produces a secondary peak at 20 keV. Similarly, molybdenum initially at 17.5 keV would give rise to Compton scattered x-rays at about 16.5 keV for an approximate 160-degree backscatter geometry.

The filter 104 of the x-ray beam may use the same high Z material of the anode. In a specific example, the XRF device 102 may use a silver filter with the silver anode. A skilled artisan may use any filtration combination to preferentially reduce unnecessary low-energy background and increase the high-energy x-rays capable of producing signal that will allow for an optimized measurement, within the scope of the present disclosure. The filter size may be dependent mostly on the radiation detector 106 chosen.

The radiation detector 106 of the XRF device 102 may be a silicon drift detector. In a specific example, the XRF device 102 may further include a high-throughput radiation detector 106 capable of measuring ~300 k counts per second. This may drastically decrease detection limits for most elements, as the in vivo measurements typically already have dead times within the optimal 50% range for these electronics to be fully utilized and likely would decrease the detection limits by at least a factor of around 2 to around 2.5.

In certain circumstances, semi-monoenergetic peaks may be obtained using optical properties to reduce the background to almost null. Mono-capillary optics allow for polarization of an x-ray beam to reduce unwanted energies. Additionally, the beam can be focused down through collimation to reduce scattering increasing signal noise. This may give a signal to noise ratio that is unprecedented in current XRF techniques.

In certain circumstances, the bone measurement system 100 may utilize a normalization factor from Compton Scattering for calibration. In a specific example, the silver anode Compton scattering peak was identified as a good predictor to soft tissue thickness. In addition, the Compton scattering peak has been shown to be reflective of other potential factors in the measurement of bone lead, such as bone geometry and composition. The Compton scattering peak had good predictability of soft tissue thickness, but it was not a perfect predictor for increasing phantoms of soft tissue. This observation was a direct result of the Compton scattering serving as a normalization factor for other geometry and composition anomalies within in vivo measurements. This was confirmed in known studies utilizing this normalization approach for mass of toenails and when doing comparisons of bone with and without soft tissue measured via XRF. The normalization differences are also evident when examining the resultant differences from calibrating with goat bone versus plaster-of-Paris phantoms. Furthermore, the Compton scattering peak identified could be fit using a traditional gaussian, although the peak itself is heavily skewed due to the surrounding x-ray anode interactions, but it was sufficient to utilize a summation of channel intensities from within plus or minus 0.5 keV from the Compton scattering peak at 20.5 keV.

In a specific non-limiting example, the Compton scattering normalization was built into the calibration alongside the 100 ppm lead phantom for measurements of signal decreases with relative increasing Lucite thickness. The calibration for concentration was found to act linearly with increasing counts proportional to concentration, but a polynomial needed to be applied for decreasing counts based on increased Compton scattering from Lucite. This interaction would normally be an exponential decay, but experimental measures before and after soft tissue removal confirmed that the polynomial fit was acceptable. Given the linear relationship with counts, the primary calibration requires a high concentration plaster-of-Paris lead standard and tissue equivalent plastic such as Lucite of varying thickness from 1 to 5 mm. This range of Lucite was shown to give enough predictability to the calibration fit.

The identification of the lead signal may be obtained in various ways. For instance, in a specific example, the lead signal identification was attempted using the 10.5 and 12.6 keV peaks. Normally, the lead alpha peak at 10.5 keV is the primarily utilized peak in XRF due to the intensity of 100% rather than 66% for the corresponding beta peak at 12.6 keV. However, the alpha peak demonstrated severe difficulties in disentangling the other peaks in the area with interactions with zinc, mercury, and arsenic. Thus, for bone lead, the present disclosure primarily used the beta peak for quantification. The fitting method utilized was a standard gaussian fit with an exponential background to identify net counts of the beta peak for lead. This equation may include:

$$a*e^{-0.5\left(\frac{x-b}{c}\right)^2} + d*e^{x*f}$$

where "a" is the gaussian height, "b" is the gaussian location, "c" is the gaussian width, "d" is the background intensity, "e" is Euler's number, and "f" corresponds with the exponential decay of background intensity.

With continued reference to the specific example, the fitting was restricted to within 12.56 to 12.66 for peak location, and the radiation detector properties dictate the width of the peak to be approximately 0.05. Accordingly, a range of 0.01 to 0.1 was utilized. The width and peak location need to have flexibility, as the background levels can change both parameters slightly in the fitting. An example of a fitted peak for a lead beta peak from an in vivo measurement is shown in FIG. 3.

As a non-limiting example, the units for measurement were identified to be ug/g bone mineral. Known studies using inductively coupled plasma mass spectrometry (ICPMS), KXRF, and portable XRF confirmed the units for measurements and conversion factor. The study outlined measurements using the standard calibration with plaster-of-Paris doped bone phantoms along with corresponding measurements of bone from portable XRF, KXRF, and ICP-MS. This was found to be a conversion factor of approximately 1.5 at the conclusion of additional in vivo studies measuring bone lead at various bones and differences between KXRF and pXRF measures from known studies with ICP-MS comparisons.

In certain circumstances, an error propagation method using standard counting statistics may be utilized to account for added uncertainty of soft tissue thickness normalizing. This error propagation method is calculated using the equation:

$$\sigma = C * \frac{\sqrt{BKG}}{\text{Net}}$$

where σ is the uncertainty as one standard deviation, BKG is the background counts under the lead L-beta peak, and Net is the net counts from the lead L-beta peak.

In certain circumstances, XRF produces a point-estimate of bone lead. In other words, if the actual results are close to zero, the estimate can be negative. Known spectroscopy techniques may incorrectly identify these are below a detection limit and cut them off at zero. Known studies using KXRF measurements identify that this unnecessarily biases the measurement analyses for the aggregate data. Thus, the data should be analyzed as is when utilizing negative results. However, many analyses have additional considerations since exposure data is quite often skewed and non-normal. Advantageously, the bone measurement system 100 of the present disclosure enhances the accuracy of the uncertainty determination by utilizing negative values from the spectroscopy results.

In certain circumstances, uncertainty weighting for analyses may be used if the uncertainties are high enough to warrant it. For instance, in a specific example, the bone measurement system 100 may utilize an inverse squared weight generated by the uncertainty as a normalization dictated by:

$$\text{Weight} = \frac{1}{U^2}$$

where U is the uncertainty given by the counting statistics and spectral fitting. Depending on the statistical approach these weights may or may not need to be normalized to 1. However, this step may be unnecessary if the uncertainties of the underlying data are low enough to be ignored.

In certain circumstances, the timing to perform the measurements with the bone measuring system may vary. For instance, the time for each measurement has changed iteratively along with the identification of the varying methodologies. Initially, two-minutes was thought to produce counting statistics capable of environmental exposures, but this inadequately represented the complexity of in vivo measurements. 3-minutes was chosen as an optimized measurement time, but for populations with more soft tissue thickness and correspondingly greater uncertainties this was shown to be too little. It is suggested that this be based primarily off live-time of the detector with a range of measurements from 3 to 5 minutes depending on the uncertainties produced during measurements. As mentioned below, dosimetry dictates below a ten-minute measurement to be permissible, but experimentally a 5-minute measurement is more than sufficient to minimize the uncertainty based on soft tissue thickness. Advantageously, the bone measuring system enhances the efficiency of measurement time by effectively obtaining the measurement in less than about five minutes.

Advantageously, the bone measurement system 100 may militate against prolonged exposure to radiation, compared to known bone measurement systems. For comparisons sake, more radiation dose may be achieved from natural background radiation or cosmic sources in any 24-hour period than is achieved from a single portable XRF measurement. The radiation dose from a portable XRF measurements may be $1/30^{th}$ of typical chest x-rays and depending on dental x-ray parameters, it may be less than $1/3_{rd}$ of a dental x-ray radiation dose.

Desirably, the metallic bone measurement system 100 may be more widely available for utilization in measurement of cumulative life-time lead exposure due to its reduced initial cost, handheld form factor, battery operated design, and fast measurement times. The enhanced efficiency and availability of the metallic bone measurement system 100 may be especially well suited for assessing the cumulative bone lead in children, which have reduced half-lives of blood lead levels, requiring more frequent testing.

Advantageously, the metallic bone measurement system 100 may efficiently and accurately correct for soft-tissue thickness. Desirably, the metallic bone measurement system 100 may be more portable and accessible than known XRF technologies.

As shown in FIG. 4, the metallic bone measurement system 100 may further include a communication interface 114, a system circuitry 116, and/or an input interface 118. The system circuitry 116 may include the processor 110 or multiple processors. The processor 110 or multiple processors execute the steps to calibrate the XRF device 102 using a Compton scattering normalization method, determine a spectral peak of the metallic source utilizing spectral analysis, quantify a density of the metallic source, based on the determined spectral peak, normalize for a soft tissue thickness utilizing an error propagation equation, and output a density of the metallic source within the bone. Alternatively, or in addition, the system circuitry 116 may include the memory 108.

The processor 110 may be in communication with the memory 108. In some examples, as shown in FIG. 4, the processor 110 may also be in communication with additional elements, such as the communication interfaces 114, the input interfaces 118, and/or the user interface 119. Examples of the processor 110 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 110 may be one or more devices operable to execute logic. The logic may include computer executable instructions or computer code stored in the memory 108 or in other memory that when executed by the processor 110, cause the processor 110 to perform the operations of the x-ray fluorescence (XRF) device and/or the radiation detector 106. The computer code may include instructions executable with the processor 110.

The memory 108 may be any device for storing and retrieving data or any combination thereof. The memory 108 may include non-volatile and/or volatile memory, such as a random-access memory (RAM), a read-only memory (ROM), an erasable programmable read-only memory (EPROM), or flash memory. Alternatively or in addition, the memory 108 may include an optical, magnetic (hard-drive), solid-state drive or any other form of data storage device. The memory 108 may be included in any component or sub-component of the system 100 described herein.

The user interface 119 may include any interface for displaying graphical information. The system circuitry 116 and/or the communications interface(s) 114 may communicate signals or commands to the user interface 119 that cause the user interface to display graphical information. Alternatively or in addition, the user interface 119 may be remote to the system 100 and the system circuitry 116 and/or communication interface(s) 114 may communicate instructions, such as HTML, to the user interface to cause the user interface to display, compile, and/or render information content. In some examples, the content displayed by the user interface 119 may be interactive or responsive to user input. For example, the user interface 119 may communicate signals, messages, and/or information back to the communications interface 114 or system circuitry 116.

The system 100 may be implemented in many different ways. In some examples, the system 100 may be implemented with one or more logical components. For example, the logical components of the system 100 may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 108, for example, that comprises instructions executable with the processor 110 or other processor to implement one or more of the features of the logical components. When any one of the logical components includes the portion of the memory that comprises instructions executable with the processor 110, the component may or may not include the processor 110. In some examples, each logical component may just be the portion of the memory 108 or other physical memory that comprises instructions executable with the processor 110, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium/memory 108 may include a hard disk, a flash drive, a cache, volatile memory, non-volatile memory, RAM, flash memory, or any other type of computer readable storage medium or storage media. The computer readable storage medium/memory 108 may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor 110 or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor 110 may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A bone measurement system configured to detect a density of a metallic source within a bone, the system comprising:
    an x-ray fluorescence (XRF) device having an x-ray tube including an x-ray source and an anode, the x-ray source configured to produce an x-ray beam;
    a filter disposed along a path of the x-ray beam;
    a radiation detector coupled to the XRF device;
    a non-transitory computer-readable storage medium storing processor-executable instructions, the storage medium communicatively coupled to the XRF device; and
    a processor electrically coupled to the storage medium;
    wherein the processor-executable instructions are executed to:
        calibrate the XRF device;
        determine a spectral peak of the metallic source utilizing spectral analysis;
        quantify a density of the metallic source, based on the determined spectral peak;
        normalize for a soft tissue thickness utilizing an error propagation equation; and
        output a density of the metallic source within the bone.

2. The bone measurement system of claim 1, wherein the quantified density of the metallic source is obtained using a gaussian fit equation.

3. The bone measurement system of claim 2, wherein the gaussian fit equation includes:

$$a*e^{-0.5\left(\frac{x-b}{c}\right)^2} + d*e^{x*f}.$$

4. The bone measurement system of claim 1, wherein the normalized density of the metallic source is derived from an error propagation equation.

5. The bone measurement system of claim 4, wherein the error propagation equation includes:

$$\sigma = C*\frac{\sqrt{BKG}}{\text{Net}}.$$

6. The bone measurement system of claim 5, wherein normalized density of the metallic source is further derived from an inverse squared weight equation of:

$$\text{Weight} = \frac{1}{U^2}.$$

7. The bone measurement system of claim 1, wherein the metallic source is one of lead, iron, nickel, and zinc.

8. The bone measurement system of claim 1, wherein the filter and the anode are constructed from the same material.

9. The bone measurement system of claim 1, wherein the anode is a silver anode.

10. The bone measurement system of claim 1, wherein the anode is a molybdenum anode.

11. The bone measurement system of claim 1, wherein the filter is a silver filter.

12. The bone measurement system of claim 1, wherein the radiation detector is a silicon drift detector.

13. The bone measurement system of claim 1, wherein the x-ray tube includes a backscatter geometry less than around one-hundred and eighty degrees to more than ninety degrees.

14. The bone measurement system of claim 13, wherein the backscatter geometry is around one-hundred and sixty degrees.

15. The bone measurement system of claim 1, wherein the XRF device is calibrated using a Compton scattering normalization method.

16. The bone measurement system of claim 1, wherein the non-transitory computer-readable storage medium and the processor are electrically coupled to the XRF device, thus providing the bone measurement system as a single device.

17. The bone measurement system of claim 1, wherein the XRF device is a mono-capillary optic along the path of the x-ray beam.

18. A method of using a bone measurement system configured to detect a density of a metallic source within a bone, the method comprising the steps of:
    providing an x-ray fluorescence (XRF) device, a filter, a radiation detector, a non-transitory computer-readable storage medium storing processor-executable instructions, and a processor, the XRF device having an x-ray tube including an x-ray source and an anode, the x-ray source configured to produce an x-ray beam, the filter disposed along a path of the x-ray beam, the radiation detector coupled to the XRF device, the storage medium communicatively coupled to the XRF device, and the processor electrically coupled to the storage medium;
    calibrating the XRF device, using a Compton scattering normalization method;
    determining a spectral peak of the metallic source utilizing spectral analysis;
    quantifying a density of the metallic source, based on the determined spectral peak;
    normalizing for a soft tissue thickness utilizing an error propagation equation; and
    outputting the density of the metallic source within the bone.

19. The method of claim 18, wherein the steps of calibrating the XRF device, determining a spectral peak of the metallic source, quantifying a density of the metallic source, normalizing for a soft tissue thickness, and outputting the density of the metallic source collectively occur in less than about five minutes.

20. The method of claim 18, further including a step of focusing the x-ray beam through collimation.

* * * * *